G. W. HOYT.
BEARING.
APPLICATION FILED SEPT. 25, 1919.
1,403,959.
Patented Jan. 17, 1922.
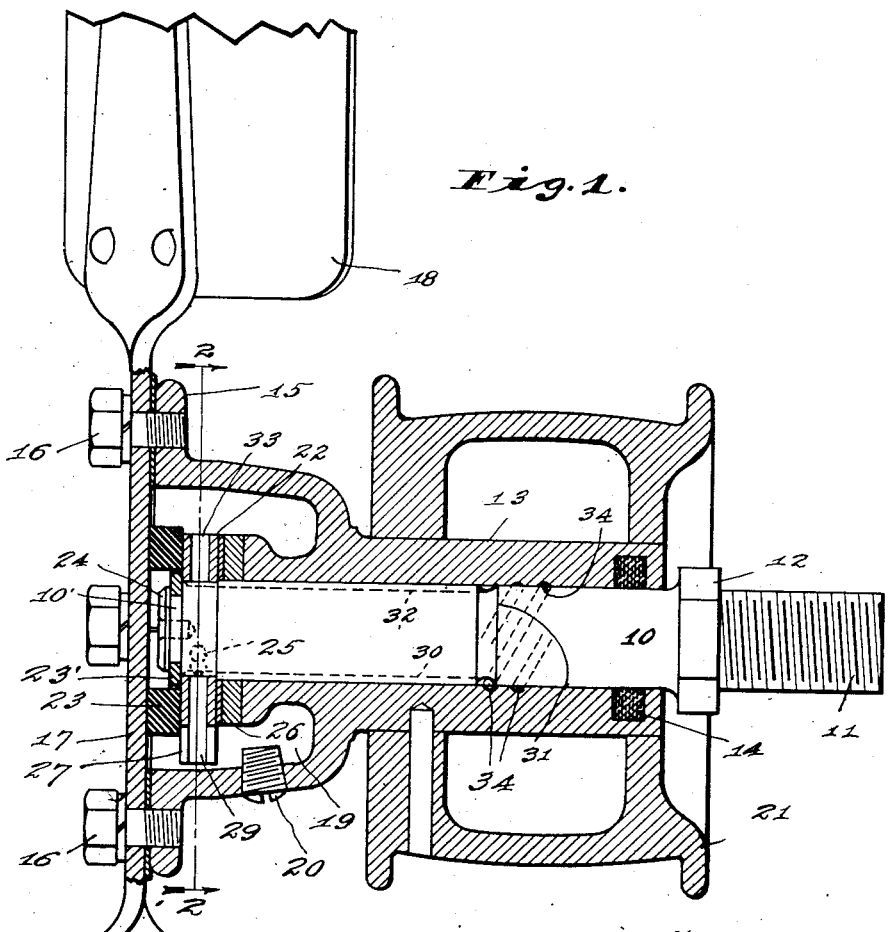
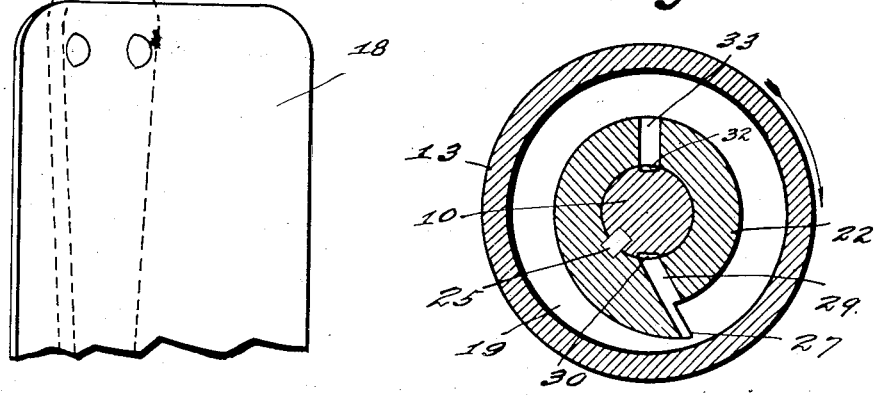
Inventor
George W. Hoyt,
By Hood & Schley
Attorneys

UNITED STATES PATENT OFFICE.

GEORGE W. HOYT, OF INDIANAPOLIS, INDIANA, ASSIGNOR TO THE OAKES CO., OF INDIANAPOLIS, INDIANA, A CORPORATION OF INDIANA.

BEARING.

1,403,959.  Specification of Letters Patent.  Patented Jan. 17, 1922.

Application filed September 25, 1919. Serial No. 326,142.

*To all whom it may concern:*

Be it known that I, GEORGE W. HOYT, a citizen of the United States, residing at Indianapolis, in the county of Marion and State of Indiana, have invented a new and useful Bearing, of which the following is a specification.

It is the object of my present invention to lubricate certain rotating structures, particularly those having plain bearings, such for instance as automobile fans.

The accompanying drawing illustrates my invention: Fig. 1 is a central longitudinal section through a fan mounting embodying my invention; and Fig. 2 is a section on the line 2—2 of Fig. 1.

The stud shaft 10 on which the fan is supported is shown as having the usual supporting end 11 and hexagonal wrench-receiving collar 12 whereby it may be attached to any convenient support. The supporting end 11 may or may not be screwed thereto. The fan hub 13 is mounted on the stud shaft 10, and is provided at the end toward the collar 12 with a suitable packing 14 for closing the joint between them. The hub 13 is enlarged at its end opposite the packing 14, and is provided with an outwardly projecting flange 15 for receiving screws 16 by which an end plate or spider 17 carrying the fan blades 18 may be attached to such hub. This provides a lubricant-holding chamber 19 within the enlarged end of the hub, to which chamber lubricant may be supplied through a suitable hole closed by a removable screw plug 20. The hub 13 may be provided with any suitable driving device, such as a pulley 21, which may or may not be integral with the hub as desired.

Near its outer end, the stud 10 is slightly reduced in diameter to receive the special washer 22, and beyond this reduced portion, the stud is provided with a shallow circumferential groove 10' adapted to receive the split spring washer 23' which is adapted to be sprung into groove 10' and has a diameter sufficient to overlie, and retain in axial position, the special washer 22. Sleeved over the washer 23' and substantially filling the space between spider 17 and washer 22 is a fiber ring 23 which serves to prevent or limit endwise play of the structure upon stud 10 and also to prevent accidental displacement of the spring washer 23'. The washer 22 is suitably held against turning on the shaft 10, as by a pin 25 fixed in one of said members and projecting into an axially extending groove in the other. Between the washer 22 and the adjacent end of the hub 13 are one or more hardened thrust plates 26 for taking the wear and withstanding the end thrust of the rotating parts.

The washer 22 is of special shape. Its outer periphery is somewhat in the shape of a single turn of a spiral, so that at the end of such single turn there is an offset 27, which I prefer to make slightly out of line with the radius as is clear from Fig. 2. This offset leads to a hole 29 extending from the inside to the outside of the washer in line with such offset, and continuing as a slot along the face of said offset, as is clear from the drawings. The inner end of the hole 29 communicates with a longitudinal slot 30 in the shaft 10. This longitudinal slot extends from the washer 22 to a circumferential slot 31 provided on the shaft 10 well toward the other end of the latter from said washer, but not so far as the packing 14. A second longitudinal groove 32 in the shaft 10, opposite the groove 30, connects the circumferential slot 31 with a radial hole 33 provided in the washer 22 opposite the hole 29. Between the packing 14 and the circumferential slot 31 the inside face of the hub 13 is provided with a short screw thread 34, which extends axially into the plane of the slot 31.

In operation, when the hub 13 is rotated the lubricant gathers by centrifugal force on the outer boundary wall of the lubricant-holding chamber 19 and travels around with the hub. This moving lubricant strikes the offset 27 of the stationary washer 22, and is deflected thereby into the hole 29. The offset 27 is thus a baffle surface; and because it is offset from the radius there is a component of force due to the moving oil tending to force said oil inward along the hole 29 more strongly than if the hole 29 were radial. The oil thus forced in through the hole 29 is fed into and along the longitudinal slot 30, to as far as the circumferential slot 31, and effectively lubricates the bearing surfaces. Any excess of oil travels from the circumferential slot 31 along the longitudinal groove 32 and outward through the radial hole 33 in the washer 22 into the lubricant-holding chamber 19. A large volume of oil is thus fed at relatively high velocity through an open passageway formed in one of the surfaces to be lubricated, and because of the free outlet for this passageway this large volume of oil is under comparatively low pressure; so that there is a flooding with oil of the surfaces to be lubricated. There is a completely open circuit for the oil. The washer 22 not only serves to feed the oil through this open passageway, but also takes the end thrust of the hub 13. Any tendency for oil to leak from the circumferential slot 31 outward past the packing 14 is counteracted by the screw thread 34, which is in the proper direction so that it tends to feed any such oil away from such packing 14 and into the circumferential slot 31. This provides an effective lubricating device, which requires no attention in operation but very infrequent re-filling.

I claim as my invention:

1. In combination, a stationary shaft, a rotating member mounted thereon and having an end thrust in one direction and provided with an internal annular lubricant-holding space, and a washer fixed on said shaft in said space and in position to receive such end thrust, said washer being provided with a surface the offset ends of which are radially offset from each other with a hole into which said offset surface leads, and said shaft being provided with a longitudinal slot communicating with the bearing surfaces of the shaft and rotating member and with said hole.

2. In combination, a stationary shaft, a rotating member mounted thereon and having an end thrust in one direction and provided with an internal annular lubricant-holding space, and a washer fixed on said shaft in said space and in position to receive such end thrust, said washer being provided with a surface the offset ends of which are radially offset from each other with a hole into which said offset surface leads, and said shaft being provided with a longitudinal slot communicating with the bearing surfaces of the shaft and rotating member and with said hole, said offset surface portion being oblique to the radius with its outer end located circumferentially further against the direction of rotation of said rotating member than is the inner end thereof.

3. In combination, a stationary shaft, a rotating member mounted thereon and provided with an internal annular lubricant-holding space, and a washer fixed on said shaft, said washer being provided with a surface the offset ends of which are radially offset from each other with a hole into which said offset surface leads, and said shaft being provided with a longitudinal slot communicating with the bearing surfaces of the shaft and rotating member and with said hole, said shaft being provided with a circumferential groove removed from said washer and communicating with said longitudinal slot and also being provided with a second longitudinal slot communicating with said circumferential slot, and said washer being provided with an oil outlet hole communicating with said second longitudinal groove.

4. In combination, a stationary supporting member, a member rotatably mounted on said supporting member and provided with an internal annular lubricant-holding space, and a washer fixed against rotation on said stationary member and provided with a deflecting surface having a radial component, one of the bearing surfaces between said two members being provided with a groove communicating with said deflecting surface to receive oil therefrom, said groove being provided with a free outlet back to said lubricant-holding space.

5. In combination, a stationary shaft, a rotating member mounted thereon and provided with an internal annular lubricant-holding space, one of the bearing surfaces between said shaft and rotating member being provided with a passageway having two points of communication with said lubricant-holding space, and a deflecting device for deflecting oil from said lubricant-holding space into said passageway at one only of said points so that the other point constitutes an oil outlet.

6. In combination, a stationary shaft, a rotating member mounted thereon and provided with an internal annular lubricant-holding space, said shaft being provided with two longitudinal slots and a circumferential groove connecting said slots, and each of said slots communicating separately with said lubricant-holding space at a point separated from said circumferential groove, and a deflecting device for deflecting oil from said lubricant-holding space into one of said slots at its point of communication with said space.

7. In combination, a stationary shaft, a rotating member mounted thereon and provided with an internal annular lubricant-holding space, said shaft being provided with two interconnected longitudinal slots, and each of said slots communicating separately with said lubricant-holding space at a point spaced from their interconnection, and a deflecting device for deflecting oil from said lubricant-holding space into one of said slots at its point of communication with said space.

8. In combination, a stationary supporting member, a member rotatably mounted on said supporting member and provided with an internal annular lubricant-holding space, one of the bearing surfaces of said two members being provided with a groove freely connected to said lubricant-holding space at two points, and means for causing oil from said lubricant-holding space to flow through said groove from one point to another when said rotatable member is rotating.

In witness whereof, I have hereunto set my hand at Indianapolis, Indiana, this 23rd day of September, A. D. one thousand nine hundred and nineteen.

GEORGE W. HOYT.